July 18, 1950  G. ISNARD  2,515,303
ARRANGEMENT FOR RAPIDLY MOUNTING DRIVING
OR DRIVEN PARTS ON THEIR SHAFTS
Filed July 25, 1945
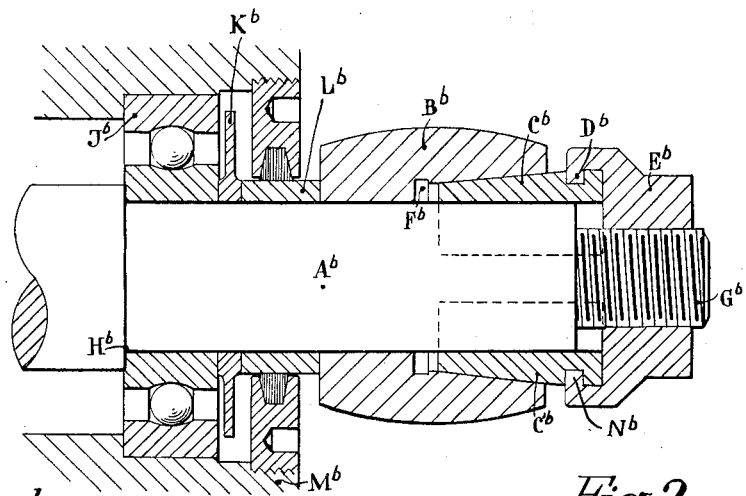
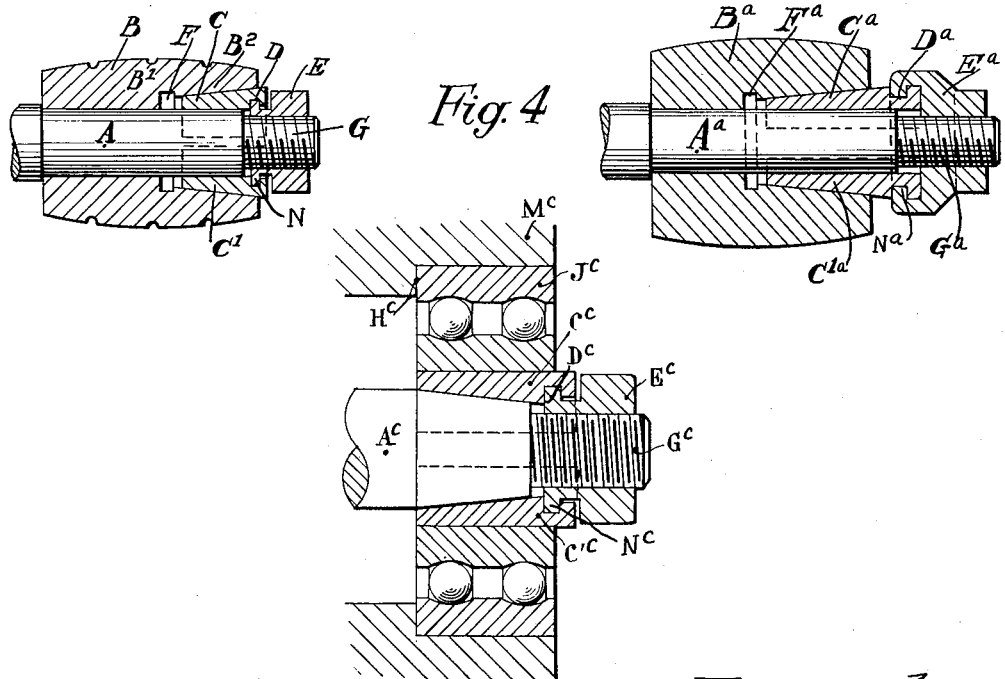

Patented July 18, 1950

2,515,303

UNITED STATES PATENT OFFICE 2,515,303

ARRANGEMENT FOR RAPIDLY MOUNTING DRIVING OR DRIVEN PARTS ON THEIR SHAFTS

Georges Isnard, Toulon, France, assignor to Societe dite: Societe Anonyme des Etablissements Isnard Freres, Toulon, France Application July 25, 1945, Serial No. 606,897
In France June 5, 1942

3 Claims. (Cl. 287—53)

A difficult and time consuming problem still exists in rapidly and fixedly securing such driving parts as for instance, pulleys or such driven members as for instance, flywheels, screws, transmission parts, on their shafts, since it involves more or less intricate mechanical expedients which are usually keyed, driven or threaded couplings, etc.

Besides, such expedients most frequently turn out defectively or dangerously: thus, keys become sheared, or the parts can be uncoupled only by the rough use of a hammer or a crowbar, this bringing about the danger of breaking said parts or bending the shafts on which same are mounted.

The arrangement providing the subject-matter of this invention is extremely simple and perfectly efficient; it does away with every keying or fitting and allows both the mounting of the part and the removal thereof rapidly and easily.

Several embodiments will be described hereinafter merely by way of example, reference being had to the drawing appended hereto.

Figure 1 is an axial cross-sectional view of the arrangement as applied to the fastening of a driving pulley on its shaft.

Figure 2 is a similar view showing a modification.

Figures 3 and 4 show in a similar way the mounting of a shaft on ball-bearings.

In the example shown in Fig. 1 a pulley B the position of which is determined by a shoulder or a collar has a sliding fit on the shaft A, and its bore fits the latter along a portion $B^1$, say for about one-half of its breadth, while it has a conical bore on the other portion at $B^2$.

A pair of bushing halves C and $C^1$ fit the shaft A at their insides while at their outsides they are machined conically to match the conical bore in portion $B^2$. Milled in said bushing halves, which together form a complete sleeve is a circular groove D in which a similarly shaped collar N is received which is extended in spaced relation from the base portion of a tightening nut E to be screwed on the threaded end G of the shaft.

It is only necessary to slip pulley B on shaft A and to push it home against the shoulder or the collar provided for that purpose, then to screw the nut E on the shaft following the fitting of the collar on the same into the grooves in the bushing halves C and $C^1$ while keeping the whole assembled during the mounting. As the nut E is tightened the shell formed by the bushing halves is forced into the conical housing provided therefor in portion $B^2$ of the pulley, whereby the said shell wedges itself between shaft A with its corresponding bore and the conical wall in the portion $B^2$ with its outer conical surface, both parts thus being made absolutely fast with each other.

For removing the pulley it is only necessary to loosen the nut E the base collar N of which, being engaged within the grove D in the shell formed by the bushing halves C, $C^1$, pulls said shell out of the conical bore $B^2$ in the pulley, whereby the latter can be removed from the shaft A without any trouble.

Preferably, the inner end of the conical bore $B^2$ terminates in a circular groove F suitably proportioned to the dimensions of the part, as shown.

Figure 2, in which primed letters of reference denote the same parts, shows a modified embodiment; the only difference resides in the external arrangement of the groove $D^a$ and the corresponding collar $N^a$ instead of the internal arrangement according to Fig. 1.

It is to be understood that both these embodiments are given merely by way of example without limiting the scope of this invention and that all unessential modifications of construction can be made thereto. Thus, the shell can be formed of more than two elements without altering the wedging action.

It is to be understood also that said arrangement allows the fastening of any desired part such as a bearing or even a ball bearing at the end of the shaft without keying, threading or the like. In the case of a ball bearing considering that the inner race is cylindrical, the cone of the bushing halves providing the shell will be located at the inner face and will become wedged on a conical section on the shaft.

Figure 3 shows the arrangement of the present invention providing the axial fastening of a series of elements on a shaft, while Fig. 4 relates to the fastening of a conventional ball bearing at the end of a shaft, the corresponding reference letters being the same but primed b and c, respectively.

The pulley $B^b$ (Fig. 3) mounted on the shaft $A^b$ is secured to the latter by a nut $E^b$ screwed on the threaded portion $G^b$, whereby the bushing halves $C^b$, $C'^b$ are forced through the medium of the collar $N^b$ in the groove $D^b$ and thus become wedged on the shaft and against the inner conical wall of the pulley $B^b$.

At the same time the above described arrangement allows without the use of any intermediate part the axial fastening and the rapid and easy removal of the series of parts interposed between the pulley $B^b$ secured on the shaft $A^b$ and the shoulder $H^b$ of the latter, which series of parts in the example shown comprises a ball bearing $J^b$, a centrifugal lubricator $K^b$ and the spacer bushing $L^b$.

Similarly, Fig. 4 shows the arrangement for mounting in position the ball bearing $J^c$ which serves as the support for the end of shaft $A^c$ on which same is mounted through the medium of the bushing halves $C^c$, $C'^c$. The wedging action is performed by the interior of the latter, the conical shape of which conforms to that of the shaft end. Since the outer race abuts the shoulder $H^c$ provided in the frame $M^c$, the inner race is secured by the mere action of the nut $E^c$ as the latter travels on the thread $G^c$ on the shaft, whereby the wedging of the pair of conical co-operating faces is obtained as a result of the engagement of the respective groove $D^c$ and collar $N^c$. The latter provide for the direct disengagement of the series of parts as the nut $E^c$ is unscrewed.

What I claim as my invention and desire to secure by Letters Patent is:

1. An arrangement for quick connection or disconnection of a driving or driven part with or from a cylindrical shaft on one end of which same is snugly fitted comprising a shoulder on said shaft against which said part is abutted, a slenderer threaded end extension on said shaft, a conical bore in that side of the said part which is remote from the one abutted against the said shoulder, a sectional shell tapered at the outside thereof to match said conical bore engaged within the same about the shaft, a clamping nut screwed on the threaded end extension of said shaft and means to make said clamping nut axially rigid with said shell.

2. In a connecting and disconnecting arrangement according to claim 1, in which the means to make said clamping nut axially rigid with said shell includes the provision on the shell of an annular groove, and a collar on the nut co-operating with the groove and the shell.

3. In a connecting and disconnecting arrangement according to claim 1 in which the means to make said clamping nut axially rigid with said shell includes the provision on the nut of an annular groove, and a collar on the shell co-operating with the groove and the nut.

GEORGES ISNARD.

REFERENCES CITED

The following references are of record in the file of this patent:

UNITED STATES PATENTS

| Number | Name | Date |
| --- | --- | --- |
| 982,403 | Whitton | Jan. 24, 1911 |
| 1,029,950 | Schulz | June 18, 1912 |
| 1,561,507 | Clark | Nov. 17, 1925 |
| 1,933,157 | Baer | Oct. 31, 1933 |

FOREIGN PATENTS

| Number | Country | Date |
| --- | --- | --- |
| 497,366 | Great Britain | Dec. 19, 1938 |